US012798132B2

(12) United States Patent
Bos et al.

(10) Patent No.: US 12,798,132 B2
(45) Date of Patent: Nov. 17, 2026

(54) PROVIDING FEEDBACK TO A USER OF A SHAVING DEVICE DURING A SHAVING OPERATION

(71) Applicant: KONINKLIJKE PHILIPS N.V., Eindhoven (NL)

(72) Inventors: Colin Bos, Eindhoven (NL); Sachin Kumarswamy, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/279,619

(22) PCT Filed: Jul. 14, 2020

(86) PCT No.: PCT/EP2020/069810

§ 371 (c)(1), (2) Date: Mar. 25, 2021

(87) PCT Pub. No.: WO2021/013618

PCT Pub. Date: Jan. 28, 2021

(65) Prior Publication Data

US 2022/0134586 A1 May 5, 2022

(30) Foreign Application Priority Data

Jul. 24, 2019 (EP) .................................... 19188088

(51) Int. Cl.
*B26B 19/38* (2006.01)

(52) U.S. Cl.
CPC .................................. *B26B 19/388* (2013.01)

(58) Field of Classification Search
CPC ... B26B 19/388; B26B 19/3886; B26B 19/00; B26B 19/12; B26B 19/02;

(Continued)

(56) References Cited

U.S. PATENT DOCUMENTS

| | | | | |
|---|---|---|---|---|
| 4,780,959 A * | 11/1988 | Sinka | .................. | B26B 21/4018 30/47 |
| 5,687,481 A * | 11/1997 | De Boer | ............... | B26B 19/388 30/43.6 |

(Continued)

FOREIGN PATENT DOCUMENTS

| | | |
|---|---|---|
| CN | 107598987 | 1/2018 |
| CN | 207841405 | 9/2018 |

(Continued)

OTHER PUBLICATIONS

Foreign Ref, EP3769921A.*

(Continued)

*Primary Examiner* — Boyer D Ashley
*Assistant Examiner* — Fernando A Ayala

(57) ABSTRACT

According to an aspect there is provided a computer-implemented method of providing feedback to a user of a shaving device during a shaving operation. The method comprises determining values for one or more parameters, the one or more parameters comprising at least one of: (i) a shaving frequency measure indicating how often the user performs a shaving operation using the shaving device, (ii) a skin irritation measure indicating skin irritation experienced by the user during and/or following a shaving operation with the shaving device, (iii) a shaving closeness measure indicating how short the user desires their hair to be after a shaving operation with the shaving device, and (iv) whether the shaving device is used on wet or dry skin during the shaving operation. The method further comprises determining a pressure range for the user based on the determined values for the one or more parameters, wherein the pressure range has an upper pressure threshold and a lower pressure threshold; during a shaving operation using the shaving device, receiving pressure measurements representing the pressure with which the shaving device is being applied onto (Continued)

the skin of the user; comparing the received pressure measurements to the determined pressure range to determine feedback for the user relating to the applied pressures with respect to the determined pressure range; and outputting a feedback control signal to a feedback component associated with the shaving device, wherein the feedback control signal is for controlling the feedback component to provide the determined feedback to the user. Other aspects provide a corresponding apparatus and computer program product.

20 Claims, 4 Drawing Sheets

(58) Field of Classification Search
CPC ............ B26B 19/3826; B26B 19/3806; B26B 19/3813; B26B 19/04; B26B 19/42; B26B 19/44; A45D 24/36
USPC ........................................................... 30/42
See application file for complete search history.

(56) References Cited

U.S. PATENT DOCUMENTS

| | | | | |
|---|---|---|---|---|
| 5,983,502 | A | 11/1999 | Geertsma | |
| 6,189,215 | B1 * | 2/2001 | Beerwerth | B26B 21/4087 30/32 |
| 8,152,695 | B2 | 4/2012 | Riley | |
| 9,758,868 | B1 * | 9/2017 | Breiling | C23C 16/4408 |
| 2001/0025421 | A1 | 10/2001 | Damstra | |
| 2009/0000126 | A1 * | 1/2009 | Kraus | B26B 19/063 30/45 |
| 2009/0056141 | A1 * | 3/2009 | Barry | B26B 21/40 30/41.7 |
| 2010/0085017 | A1 * | 4/2010 | Heeringa | B26B 19/3873 320/149 |
| 2011/0314677 | A1 * | 12/2011 | Meier | A46B 15/0002 30/41.8 |
| 2014/0311581 | A1 * | 10/2014 | Belostotskiy | H01L 21/67253 137/565.13 |
| 2015/0209540 | A1 * | 7/2015 | Hendriks | A61M 16/0683 128/205.25 |
| 2016/0003698 | A1 * | 1/2016 | Wiesbauer | H04R 19/04 381/174 |
| 2016/0089083 | A1 * | 3/2016 | Sutton | A61B 5/7455 600/587 |
| 2016/0091385 | A1 * | 3/2016 | Heshmati | G01L 27/005 73/1.57 |
| 2016/0236360 | A1 * | 8/2016 | Veltman | B26B 19/388 |
| 2016/0256184 | A1 * | 9/2016 | Shelton, IV | A61B 17/295 |
| 2016/0297085 | A1 * | 10/2016 | Uit De Bulten | B26B 21/4056 |
| 2017/0052802 | A1 * | 2/2017 | Ko | H04W 4/80 |
| 2017/0071816 | A1 * | 3/2017 | Vain | A61F 5/0123 |
| 2017/0095810 | A1 * | 4/2017 | Li | F04B 43/043 |
| 2017/0107782 | A1 * | 4/2017 | Mckenzie | E21B 33/127 |
| 2018/0000219 | A1 * | 1/2018 | Roenneberg | A45D 26/0076 |
| 2018/0141526 | A1 * | 5/2018 | Li | B60T 8/172 |
| 2018/0236675 | A1 | 8/2018 | Westerhof | |
| 2019/0015998 | A1 * | 1/2019 | Neyer | G01R 31/343 |
| 2019/0061183 | A1 | 2/2019 | Neyer | |
| 2019/0126500 | A1 * | 5/2019 | Wu | B26B 19/38 |
| 2019/0224864 | A1 * | 7/2019 | Robinson | G06F 3/011 |
| 2019/0224868 | A1 * | 7/2019 | Robinson | B26B 21/526 |
| 2019/0224869 | A1 * | 7/2019 | Robinson | B26B 21/227 |
| 2019/0299434 | A1 * | 10/2019 | Fuerst | B26B 19/046 |
| 2019/0299435 | A1 * | 10/2019 | Fuellgrabe | B26B 19/3886 |
| 2019/0299437 | A1 | 10/2019 | Fuellgrabe | |
| 2019/0306259 | A1 * | 10/2019 | Burghardt | B26B 21/4081 |
| 2020/0202521 | A1 * | 6/2020 | Joyce | A61B 5/0077 |
| 2020/0230834 | A1 * | 7/2020 | Petratou | B26B 21/4056 |
| 2020/0316799 | A1 * | 10/2020 | Tsegenidis | B26B 21/4087 |
| 2020/0376768 | A1 * | 12/2020 | Bruggeman | B29C 64/106 |
| 2020/0397546 | A1 * | 12/2020 | Miller | H02J 7/00 |
| 2021/0146560 | A1 * | 5/2021 | Panagiotopoulou | B26B 21/44 |
| 2022/0000418 | A1 * | 1/2022 | Knight | A61B 5/7278 |
| 2022/0009113 | A1 * | 1/2022 | Isenschmid | B26B 19/063 |
| 2022/0288800 | A1 * | 9/2022 | Hendriks | A61B 18/203 |

FOREIGN PATENT DOCUMENTS

| | | | | |
|---|---|---|---|---|
| EP | 3366195 | | 8/2018 | |
| EP | 3401065 | | 11/2018 | |
| EP | 18164369.3 | * | 2/2019 | B26B 21/4056 |
| EP | 3769921 A1 | * | 1/2021 | G06F 3/016 |
| JP | H09501090 A | * | 5/2019 | B26B 19/14 |
| KR | 101741905 | | 2/2017 | |
| WO | 2018/206805 | | 11/2018 | |

OTHER PUBLICATIONS

International Search Report and Written Opinion Dated Oct. 13, 2020 for International Application No. PCT/EP2020/069810 Filed Jul. 14, 2020.

* cited by examiner

PROVIDING FEEDBACK TO A USER OF A SHAVING DEVICE DURING A SHAVING OPERATION

CROSS REFERENCE TO RELATED APPLICATIONS

This application is the U.S. National Phase application under 35 U.S.C. § 371 of International Application No. PCT/EP2020/069810 filed Jul. 14, 2020, which claims the benefit of European Patent Application Number 19188088.9 filed Jul. 24, 2019. These applications are hereby incorporated by reference herein.

FIELD OF THE INVENTION

The invention relates to a computer-implemented method, an apparatus and a computer program product for providing feedback to a user of a shaving device during a shaving operation, and in particular feedback relating to the pressure that the shaving device is being applied to the skin.

BACKGROUND OF THE INVENTION

Shaving performance, for example in terms of the closeness of the shave and irritation caused to the skin, is largely influenced by the handling of a shaving device by the user. It is known that people with a high degree of skin irritation after shaving could benefit from receiving advice or guidance about how to improve shaving motion and the pressure with which the shaving device is applied to the user's skin.

Despite various improvements to shaving devices over the years to provide a good shaving experience and the best shaving results, recent tests have shown that a large proportion of men do not use the correct shaving technique when shaving their face, in terms of applying the shaving device with the right pressure and moving the shaving device with the right motion. Particularly in the case of rotary shaving devices (in which hairs are cut using cutting elements that comprise one or more circular blades that rotate rapidly), a lot of men press their shaving device too firmly or too softly onto their skin and use linear motion instead of circular motion. Using a shaving device with a suboptimal shaving technique can lead to dissatisfaction with the shaving results.

It is therefore desirable to guide users to the optimal shaving technique. WO 2018/206805 describes that feedback can be provided regarding the motion of a rotary shaver to encourage a user to move a rotary shaver with small rotational motion. However, as noted above it is also desirable for the user to apply the shaving device on to the skin with an appropriate pressure.

Therefore there is a need for techniques that determine and provide suitable feedback relating to the pressure that a shaving device is being applied to the skin that can encourage a user to use a correct pressure.

SUMMARY OF THE INVENTION

According to a first aspect, there is provided a computer-implemented method of providing feedback to a user of a shaving device during a shaving operation. The method comprising: determining values for one or more parameters, the one or more parameters comprising at least one of: (i) a shaving frequency measure indicating how often the user performs a shaving operation using the shaving device, (ii) a skin irritation measure indicating skin irritation experienced by the user during and/or following a shaving operation with the shaving device, (iii) shaving closeness measure indicating how short the user desires their hair to be after a shaving operation with the shaving device, and (iv) whether the shaving device is used on wet or dry skin during the shaving operation; determining a pressure range for the user based on the determined values for the one or more parameters, wherein the pressure range has an upper pressure threshold and a lower pressure threshold; during a shaving operation using the shaving device, receiving pressure measurements representing the pressure with which the shaving device is being applied onto the skin of the user; comparing the received pressure measurements to the determined pressure range to determine feedback for the user relating to the applied pressures with respect to the determined pressure range; and outputting a feedback control signal to a feedback component associated with the shaving device, wherein the feedback control signal is for controlling the feedback component to provide the determined feedback to the user. Thus, the first aspect enables suitable feedback relating to the pressure that a shaving device is being applied to the skin to be determined and provided that can encourage a user to use a correct pressure for shaving.

In some embodiments the step of determining values comprises determining values of all of the shaving frequency measure, skin irritation measure, shaving closeness measure and whether the shaving device is used on wet or dry skin.

In some embodiments, when the one or more parameters comprises at least the shaving frequency measure, the step of determining the pressure range can comprise setting the lower pressure threshold to a first lower pressure threshold value when the shaving frequency measure has a first shaving frequency value and setting the lower pressure threshold to a second lower pressure threshold value when the shaving frequency measure has a second shaving frequency value, wherein the first shaving frequency value represents more frequent shaving than the second shaving frequency value and the first lower pressure threshold value is lower than the second lower pressure threshold value. Thus the more frequently that the user performs a shaving operation, the lower the lower pressure threshold.

In some embodiments, when the one or more parameters comprises at least the skin irritation measure, the step of determining the pressure range can comprise setting the upper pressure threshold to a first upper pressure threshold value when the skin irritation measure has a first skin irritation value and setting the upper pressure threshold to a second upper pressure threshold value when the skin irritation measure has a second skin irritation value, wherein the first skin irritation value represents more skin irritation than the second skin irritation value and the first upper pressure threshold value is lower than the second upper pressure threshold value. Thus the higher the skin irritation, the lower the upper pressure threshold, since the skin irritation may be due to, or worsened by, pressing the shaving device on to the skin too firmly.

In some embodiments, when the one or more parameters comprises at least the shaving closeness measure, the step of determining the pressure range can comprise setting the upper pressure threshold to a first upper pressure threshold value when the shaving closeness measure has a first shaving closeness value and setting the upper pressure threshold to a second upper pressure threshold value when the shaving closeness measure has a second shaving closeness value, wherein the first shaving closeness value represents a closer shave than the second shaving closeness value and the first upper pressure threshold value is higher than the second upper pressure threshold value. Thus, the closer the shave is to be (i.e. the shorter the hair after the shaving operation), the higher the upper pressure threshold should be.

In some embodiments, when the one or more parameters comprises at least whether the shaving device is used on wet or dry skin during the shaving operation, the step of determining the pressure range can comprise setting the upper pressure threshold to a first upper pressure threshold value when the shaving device is used on dry skin and setting the upper pressure threshold to a second upper pressure threshold value when the shaving device is used on wet skin, wherein the first upper pressure threshold value is higher than the second upper pressure threshold value. Thus, the upper pressure threshold is lower if the shaving device is used on wet skin than compared to dry skin.

In some embodiments the step of determining values comprises receiving one or more of the values as inputs via a user interface. This enables the user to input their preferred values for one or more of the parameters, such as the desired shaving closeness and/or shaving frequency.

In some embodiments the one or more parameters comprises at least the shaving frequency measure, and the step of determining values comprises receiving usage information on use of the shaving device over a time period; and analysing the usage information to determine how often the user performs a shaving operation. Thus in some embodiments the value of the shaving frequency measure can be determined automatically.

In some embodiments the one or more parameters comprises at least the skin irritation measure, and the step of determining values comprises receiving a first measurement signal from a first sensor that observes or measures the skin of the user; and analysing the received first measurement signal to determine a value of the skin irritation of the skin. Thus in some embodiments the skin irritation measure can be determined automatically.

In some embodiments the one or more parameters comprises at least whether the shaving device is used on wet or dry skin during the shaving operation, and the step of determining values comprises receiving a second measurement signal from a moisture sensor that measures moisture on the skin of the user and/or on the shaving device; and analysing the received second measurement signal to determine whether the shaving device is used on wet or dry skin during the shaving operation. Thus in some embodiments it can be determined whether the shaving device is used on wet or dry skin automatically.

In some embodiments the step of determining feedback comprises determining first feedback indicating correct pressure if the applied pressure is within the determined pressure range, and determining second feedback indicating incorrect pressure if the applied pressure is outside the determined pressure range.

In these embodiments the pressure range can further comprise a first boundary region around the lower pressure threshold and a second boundary region around the upper pressure threshold; and the step of determining feedback can comprise: (i) determining the first feedback indicating correct pressure if the applied pressure is within the determined pressure range and outside the first boundary region and the second boundary region; (ii) determining the second feedback indicating incorrect pressure if the applied pressure is outside the determined pressure range and outside the first boundary region and the second boundary region; and (iii) determining intermediate feedback if the applied pressure is within the first boundary region or the second boundary region, wherein the intermediate feedback is a weighted combination of the first feedback and the second feedback, wherein the weighting for the first feedback and the weighting for the second feedback are each performed based on linear functions of the applied pressure. Thus, these embodiments provide that there is a gradual transition between the first feedback and the second feedback which can help the user to interpret the feedback and adjust their behaviour to the correct pressure.

In alternative embodiments, the step of determining feedback comprises determining first feedback indicating correct pressure if the applied pressure is within the determined pressure range, determining second feedback indicating low incorrect pressure if the applied pressure is below the lower pressure threshold, and determining third feedback indicating high incorrect pressure if the applied pressure is above the upper pressure threshold. These embodiments have the advantage that the adjustment required by the user to achieve the correct pressure is more intuitive due to the feedback being different depending on whether the applied pressure is too high or too low.

In these embodiments the pressure range can further comprise a first boundary region around the lower pressure threshold and a second boundary region around the upper pressure threshold; and the step of determining feedback can comprise: (i) determining the first feedback indicating correct pressure if the applied pressure is within the determined pressure range and outside the first boundary region and the second boundary region; (ii) determining the second feedback indicating low incorrect pressure if the applied pressure is below the lower pressure threshold and outside the first boundary region; (iii) determining the third feedback indicating high incorrect pressure if the applied pressure is above the upper pressure threshold and outside the second boundary region; (iv) determining first intermediate feedback if the applied pressure is within the first boundary region, wherein the first intermediate feedback is a weighted combination of the first feedback and the second feedback, wherein the weighting for the first feedback and the weighting for the second feedback are each performed based on linear functions of the applied pressure; and (v) determining second intermediate feedback if the applied pressure is within the second boundary region, wherein the second intermediate feedback is a weighted combination of the first feedback and the third feedback; wherein the weighting for the first feedback and the weighting for the third feedback are each performed based on linear functions of the applied pressure. Thus, these embodiments provide that there is a gradual transition between the first feedback and the second feedback and between the first feedback and the third feedback which can further help the user to interpret the feedback and adjust their behaviour to the correct pressure.

In some embodiments the determined feedback is a colour of one or more light elements. In alternative embodiments, the feedback component is any one or more of: one or more light elements, one or more loudspeakers, a display screen, and one or more haptic feedback components.

In some embodiments the step of comparing comprises filtering the received pressure measurements with a low pass filter, and comparing the filtered pressure measurements to the determined pressure range to determine the feedback. As the applied pressure/force can vary over quite short timescales during a shaving operation and/or there may be noise/artefacts in the measured pressure, the low pass filtering has the benefit that it avoids the feedback rapidly alternating as this may make it difficult for the user to adapt their use of the shaving device in an appropriate way, and it can be distracting for the user. In these embodiments the low pass filter can have a time constant selected from the range of 0.1 seconds to 0.7 seconds, such as 0.2 seconds.

In some embodiments the method further comprises the steps of: receiving movement measurements representing movement of the shaving device by the user during a shaving operation; processing the received movement measurements to determine a type of motion of the shaving device by the user; and determining motion feedback for the user relating to the determined type of motion; wherein the feedback control signal is further for controlling the feedback component to provide the determined motion feedback to the user. Thus, in these embodiments, feedback is provided on both the pressure that the shaving device is being pressed on to the skin with, and also the motion of the shaving device.

In some embodiments the method further comprises the steps of, after one or more shaving operations, receiving an indication of the satisfaction of the user with the one or more shaving operations; if the received indication indicates that the user is not satisfied with the one or more shaving operations, providing an output to the user that indicates to the user to change the value of the one or more parameters.

In some embodiments the method is performed in the shaving device. In alternative embodiments, the method is performed in a device separate from the shaving device.

In some embodiments the feedback component is part of the shaving device.

According to a second aspect, there is provided a computer program product comprising a computer readable medium. The computer readable medium has computer readable code embodied therein. The computer readable code is configured such that, on execution by a suitable computer or processor, the computer or processor is caused to perform the method according to the first aspect or any embodiment thereof.

According to a third aspect, there is provided an apparatus for providing feedback to a user of a shaving device during a shaving operation. The apparatus comprises a processing unit is configured to: determine values for one or more parameters, the one or more parameters comprising at least one of: (i) a shaving frequency measure indicating how often the user performs a shaving operation using the shaving device, (ii) a skin irritation measure indicating skin irritation experienced by the user during and/or following a shaving operation with the shaving device, (iii) shaving closeness measure indicating how short the user desires their hair to be after a shaving operation with the shaving device, and (iv) whether the shaving device is used on wet or dry skin during the shaving operation; determine a pressure range for the user based on the determined values for the one or more parameters, wherein the pressure range has an upper pressure threshold and a lower pressure threshold; during a shaving operation using the shaving device, receive pressure measurements representing the pressure with which the shaving device is being applied onto the skin of the user; compare the received pressure measurements to the determined pressure range to determine feedback for the user relating to the applied pressures with respect to the determined pressure range; and output a feedback control signal to a feedback component associated with the shaving device, wherein the feedback control signal is for controlling the feedback component to provide the determined feedback to the user. Thus, the third aspect enables suitable feedback relating to the pressure that a shaving device is being applied to the skin to be determined and provided that can encourage a user to use a correct pressure for shaving.

In some embodiments the processing unit is configured to determine values of all of the shaving frequency measure, skin irritation measure, shaving closeness measure and whether the shaving device is used on wet or dry skin.

In some embodiments, when the one or more parameters comprises at least the shaving frequency measure, the processing unit can be configured to determine the pressure range by setting the lower pressure threshold to a first lower pressure threshold value when the shaving frequency measure has a first shaving frequency value and setting the lower pressure threshold to a second lower pressure threshold value when the shaving frequency measure has a second shaving frequency value, wherein the first shaving frequency value represents more frequent shaving than the second shaving frequency value and the first lower pressure threshold value is lower than the second lower pressure threshold value. Thus the more frequently that the user performs a shaving operation, the lower the lower pressure threshold.

In some embodiments, when the one or more parameters comprises at least the skin irritation measure, the processing unit can configured to step of determining the pressure range by setting the upper pressure threshold to a first upper pressure threshold value when the skin irritation measure has a first skin irritation value and setting the upper pressure threshold to a second upper pressure threshold value when the skin irritation measure has a second skin irritation value, wherein the first skin irritation value represents more skin irritation than the second skin irritation value and the first upper pressure threshold value is lower than the second upper pressure threshold value. Thus the higher the skin irritation, the lower the upper pressure threshold, since the skin irritation may be due to, or worsened by, pressing the shaving device on to the skin too firmly.

In some embodiments, when the one or more parameters comprises at least the shaving closeness measure, the processing unit can be configured to determine the pressure range by setting the upper pressure threshold to a first upper pressure threshold value when the shaving closeness measure has a first shaving closeness value and setting the upper pressure threshold to a second upper pressure threshold value when the shaving closeness measure has a second shaving closeness value, wherein the first shaving closeness value represents a closer shave than the second shaving closeness value and the first upper pressure threshold value is higher than the second upper pressure threshold value. Thus, the closer the shave is to be (i.e. the shorter the hair after the shaving operation), the higher the upper pressure threshold should be.

In some embodiments, when the one or more parameters comprises at least whether the shaving device is used on wet or dry skin during the shaving operation, the processing unit can be configured to determine the pressure range by setting the upper pressure threshold to a first upper pressure threshold value when the shaving device is used on dry skin and setting the upper pressure threshold to a second upper pressure threshold value when the shaving device is used on wet skin, wherein the first upper pressure threshold value is higher than the second upper pressure threshold value. Thus, the upper pressure threshold is lower if the shaving device is used on wet skin than compared to dry skin.

In some embodiments the processing unit is configured to determine the values by receiving one or more of the values as inputs via a user interface. This enables the user to input their preferred values for one or more of the parameters, such as the desired shaving closeness and/or shaving frequency.

In some embodiments the one or more parameters comprises at least the shaving frequency measure, and the processing unit is configured to determine the values by receiving usage information on use of the shaving device over a time period; and analysing the usage information to determine how often the user performs a shaving operation. Thus in some embodiments the value of the shaving frequency measure can be determined automatically.

In some embodiments the one or more parameters comprises at least the skin irritation measure, and the processing unit is configured to determine the values by receiving a first measurement signal from a first sensor that observes or measures the skin of the user; and analysing the received first measurement signal to determine a value of the skin irritation of the skin. Thus in some embodiments the skin irritation measure can be determined automatically.

In some embodiments the one or more parameters comprises at least whether the shaving device is used on wet or dry skin during the shaving operation, and the processing unit is configured to determine the values by receiving a second measurement signal from a moisture sensor that measures moisture on the skin of the user and/or on the shaving device; and analysing the received second measurement signal to determine whether the shaving device is used on wet or dry skin during the shaving operation. Thus in some embodiments it can be determined whether the shaving device is used on wet or dry skin automatically.

In some embodiments the processing unit is configured to determine feedback by determining first feedback indicating correct pressure if the applied pressure is within the determined pressure range, and determining second feedback indicating incorrect pressure if the applied pressure is outside the determined pressure range.

In these embodiments the pressure range can further comprise a first boundary region around the lower pressure threshold and a second boundary region around the upper pressure threshold; and the processing unit can be further configured to determine feedback by: (i) determining the first feedback indicating correct pressure if the applied pressure is within the determined pressure range and outside the first boundary region and the second boundary region; (ii) determining the second feedback indicating incorrect pressure if the applied pressure is outside the determined pressure range and outside the first boundary region and the second boundary region; and (iii) determining intermediate feedback if the applied pressure is within the first boundary region or the second boundary region, wherein the intermediate feedback is a weighted combination of the first feedback and the second feedback, wherein the weighting for the first feedback and the weighting for the second feedback are each performed based on linear functions of the applied pressure. Thus, these embodiments provide that there is a gradual transition between the first feedback and the second feedback which can help the user to interpret the feedback and adjust their behaviour to the correct pressure.

In alternative embodiments, the processing unit is configured to determine feedback by determining first feedback indicating correct pressure if the applied pressure is within the determined pressure range, determining second feedback indicating low incorrect pressure if the applied pressure is below the lower pressure threshold, and determining third feedback indicating high incorrect pressure if the applied pressure is above the upper pressure threshold. These embodiments have the advantage that the adjustment required by the user to achieve the correct pressure is more intuitive due to the feedback being different depending on whether the applied pressure is too high or too low.

In these embodiments the pressure range can further comprise a first boundary region around the lower pressure threshold and a second boundary region around the upper pressure threshold; and the processing unit can be further configured to determine feedback by: (i) determining the first feedback indicating correct pressure if the applied pressure is within the determined pressure range and outside the first boundary region and the second boundary region; (ii) determining the second feedback indicating low incorrect pressure if the applied pressure is below the lower pressure threshold and outside the first boundary region; (iii) determining the third feedback indicating high incorrect pressure if the applied pressure is above the upper pressure threshold and outside the second boundary region; (iv) determining first intermediate feedback if the applied pressure is within the first boundary region, wherein the first intermediate feedback is a weighted combination of the first feedback and the second feedback, wherein the weighting for the first feedback and the weighting for the second feedback are each performed based on linear functions of the applied pressure; and (v) determining second intermediate feedback if the applied pressure is within the second boundary region, wherein the second intermediate feedback is a weighted combination of the first feedback and the third feedback; wherein the weighting for the first feedback and the weighting for the third feedback are each performed based on linear functions of the applied pressure. Thus, these embodiments provide that there is a gradual transition between the first feedback and the second feedback and between the first feedback and the third feedback which can further help the user to interpret the feedback and adjust their behaviour to the correct pressure.

In some embodiments the determined feedback is a colour of one or more light elements. In alternative embodiments, the feedback component is any one or more of: one or more light elements, one or more loudspeakers, a display screen, and one or more haptic feedback components.

In some embodiments the processing unit is further configured to filter the received pressure measurements with a low pass filter, and compare the filtered pressure measurements to the determined pressure range to determine the feedback. As the applied pressure/force can vary over quite short timescales during a shaving operation and/or there may be noise/artefacts in the measured pressure, the low pass filtering has the benefit that it avoids the feedback rapidly alternating as this may make it difficult for the user to adapt their use of the shaving device in an appropriate way, and it can be distracting for the user. In these embodiments the low pass filter can have a time constant selected from the range of 0.1 seconds to 0.7 seconds, such as 0.2 seconds.

In some embodiments the processing unit is further configured to: receive movement measurements representing movement of the shaving device by the user during a shaving operation; process the received movement measurements to determine a type of motion of the shaving device by the user; and determine motion feedback for the user relating to the determined type of motion; wherein the feedback control signal is further for controlling the feedback component to provide the determined motion feedback to the user. Thus, in these embodiments, feedback is provided on both the pressure that the shaving device is being pressed on to the skin with, and also the motion of the shaving device.

In some embodiments the processing unit is further configured to, after one or more shaving operations, receive an indication of the satisfaction of the user with the one or more shaving operations; if the received indication indicates that the user is not satisfied with the one or more shaving operations, provide an output to the user that indicates to the user to change the value of the one or more parameters.

In some embodiments the apparatus is part of the shaving device. In alternative embodiments, the apparatus is separate from the shaving device.

In some embodiments the feedback component is part of the shaving device.

These and other aspects will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The techniques described herein are applicable to a shaving device that is applied (pressed) on to the skin of a user and moved over the skin to perform a shaving operation in which hairs on the skin are cut. The shaving device may be any type of shaving device, such as a foil-based shaving device or a rotary shaving device. A rotary shaving device is a type of shaving device that cuts hairs using cutting elements that comprise one or more circular blades that rotate rapidly. Preferably, a rotary shaving device is to be moved over the skin using a rotational motion, so that the shaving device for example follows an approximately circular path on the skin of the user. A rotary shaving device typically comprises at least two cutting elements, and preferably three cutting elements arranged in a triangle, although rotary shaving devices having different numbers of cutting elements and/or arrangements are available. It has been found that moving a rotary shaving device with small rotational motions provides an improved shaving performance, particularly in terms of reducing skin irritation. However, it is still important for a shaving device (whether rotary or foil-based) to be applied to the skin with the correct pressure. Thus the techniques described herein enable feedback to be provided on the pressure that the shaving device is being applied on to the skin of a user.

Figure 1:
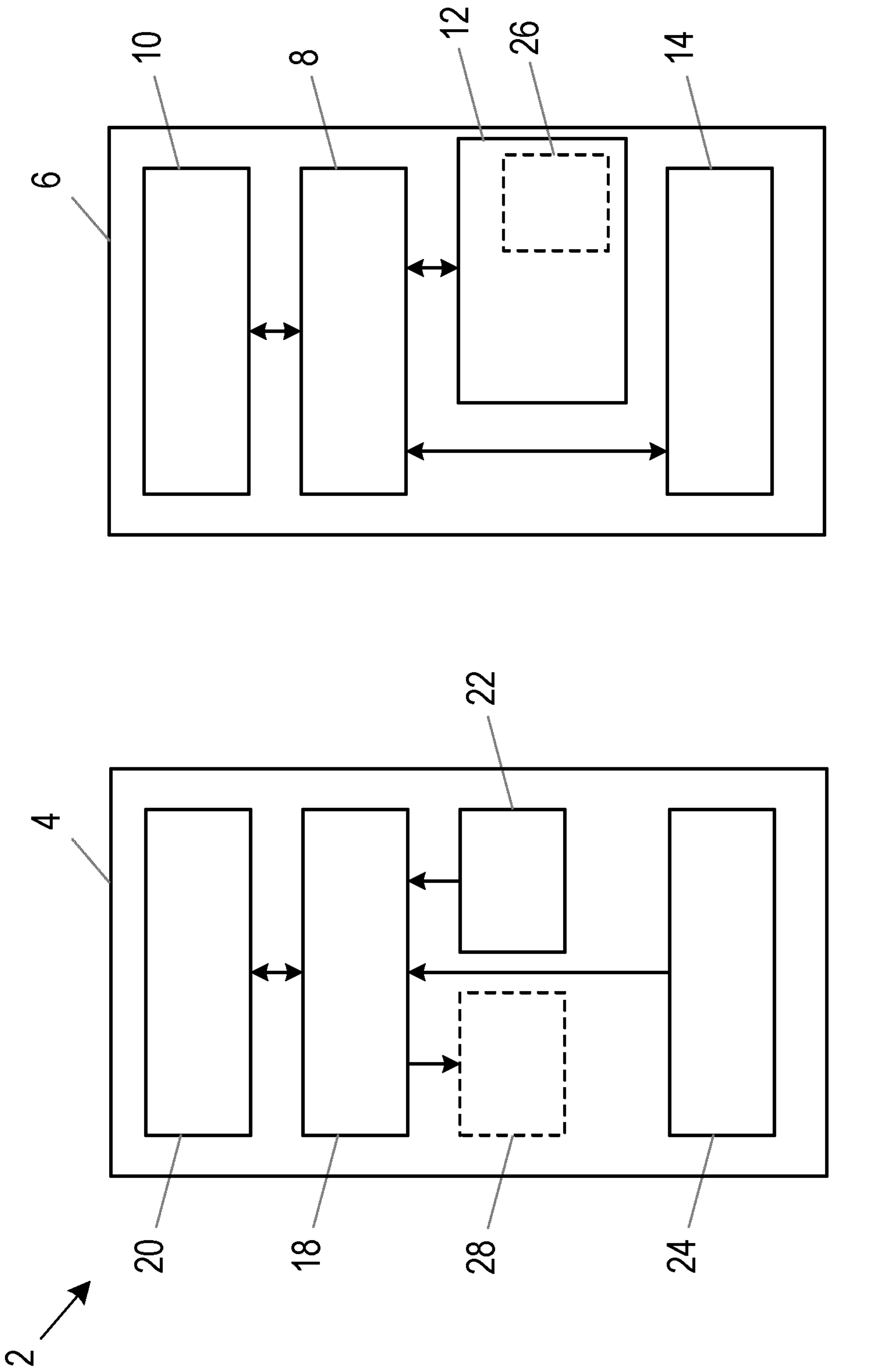
FIG. 1 is a block diagram of a shaving system according to various embodiments that comprises a shaving device and an apparatus.

FIG. 1 is a block diagram of a shaving system 2 according to various embodiments that comprises a shaving device 4 and an apparatus 6. In these various embodiments, the apparatus 6 can be used to determine a pressure range for the user based on values for one or more specific parameters; and to determine feedback that is to be provided to the user by comparing the pressure range to measurements of the pressure with which the shaving device is being applied to the skin. As noted below, in various other embodiments, the apparatus 6 may only determine the pressure range, and the shaving device 4 may determine the feedback. Also as noted below, in various other embodiments, the shaving system 2 may not include a separate apparatus 6, and the functionality of the apparatus 6 described herein may be provided in or by the shaving device 4.

In the illustrated embodiment, the apparatus 6 comprises a processing unit 8, a memory unit 10, user interface components 12 and interface circuitry 14. In some embodiments, the apparatus 6 is in the form of an electronic device, such as a smart phone, a smart watch, a tablet, a personal digital assistant (PDA), a laptop, a desktop computer, a smart mirror, etc., or it can be in the form of a charging station or base station for the shaving device 4.

The processing unit 8 generally controls the operation of the apparatus 6 and may implement one or more of the processing steps provided by the techniques described herein. The processing unit 8 can be implemented in numerous ways, with software and/or hardware, to perform the various functions described below. The processing unit 8 may comprise one or more microprocessors or digital signal processors (DSPs) that may be programmed, using software or computer program code, to perform the required functions and/or to control components of the processing unit 4 to effect the required functions. The processing unit 8 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The processing unit 8 is connected to memory unit 10 that can store data, information and/or signals for use by the processing unit 8 in controlling the operation of the apparatus 6 and/or in executing or performing the methods described herein. In some implementations the memory unit 10 stores computer-readable code that can be executed by the processing unit 8 so that the processing unit 8 performs one or more functions, including the methods described herein. In particular embodiments, the program code can be in the form of an application for a smart watch, a smart phone, tablet, laptop or computer. The memory unit 10 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM) and electrically erasable PROM (EEPROM), implemented in the form of a memory chip, an optical disk (such as a compact disc (CD), a digital versatile disc (DVD) or a Blu-Ray disc), a hard disk, a tape storage solution, or a solid state device, including a memory stick, a solid state drive (SSD), a memory card, etc.

The user interface components 12 include one or more components that enables a user of apparatus 6 to input information, values, data and/or commands into the apparatus 6, for example inputting values of the specific parameter(s) used to determine a pressure range, and/or enables the apparatus 6 to output information or data to the user of the apparatus 6. The user interface components 12 can comprise any suitable input component(s), including but not limited to a keyboard, keypad, one or more buttons, switches or dials, a mouse, a track pad, a touchscreen, a stylus, a camera, a microphone, etc., and the user interface components 12 can comprise any suitable output component(s), including but not limited to a display screen, one or more lights or light elements, one or more loudspeakers, one or more haptic feedback components, such as a vibrating element, etc.

In the embodiment of the shaving system 2 shown in FIG. 1, as the apparatus 6 is separate from the shaving device 4, the interface circuitry 14 in the apparatus 6 enables a data connection to and/or from the shaving device 4, and/or a data connection to and/or from other devices, such as a server, a database, etc. The connection may be direct or indirect (e.g. via the Internet), and thus the interface circuitry 14 can enable a connection between the apparatus 6 and a network, such as the Internet, or between the apparatus 6 and shaving device 4, via any desirable wired or wireless communication protocol. For example, the interface circuitry 14 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.). In the case of a wireless connection, the interface circuitry 14 (and thus apparatus 6) may include one or more suitable antennas for transmitting/receiving over a transmission medium (e.g. the air). Alternatively, in the case of a wireless connection, the interface circuitry 14 may include means (e.g. a connector or plug) to enable the interface circuitry 14 to be connected to one or more suitable antennas external to the apparatus 6 for transmitting/receiving over a transmission medium (e.g. the air). The interface circuitry 14 is connected to the processing unit 8 to enable information or data received by the interface circuitry 14 to be provided to the processing unit 8, and/or information or data from the processing unit 8 to be transmitted by the interface circuitry 14.

The shaving device 4 comprises a processing unit 18, a memory unit 20, a pressure sensor 22 and interface circuitry 24. The processing unit 18 is generally for controlling the operation of the shaving device 4, and may implement one or more of the processing steps provided by the techniques described herein. The processing unit 18 may be implemented in any of the ways described above with respect to the processing unit 8 in the apparatus 6.

The memory unit 20 is connected to the processing unit 18 and can store data, information and/or signals for use by the processing unit 18 in controlling the operation of the shaving device 4 and/or in executing or performing the methods described herein. In some implementations the memory unit 20 stores computer-readable code that can be executed by the processing unit 18 so that the processing unit 18 performs one or more functions, including the methods described herein. The memory unit 20 may be implemented in any of the ways described above with respect to the memory unit 20 in the apparatus 6.

The pressure sensor 22 is provided to measure the pressure or force with which the shaving device 4 is being applied or pressed on to the skin of the user during a shaving operation. Any suitable type of pressure sensor can be used, for example a piezoelectric-based pressure sensor. The pressure sensor 22 will typically be positioned near to a surface of the shaving device 4 that is placed into contact with the skin during shaving so the pressure can be measured. For example the pressure sensor can be placed beneath a cutting element or a part of the alongside the cutting element. In some embodiments the shaving device 4 can include multiple pressure sensors 22, for example each associated with a respective cutting element.

The pressure sensor 22 can measure the pressure according to a sampling rate and output a time-series of pressure measurements in the form of a pressure measurement signal to the processing unit 18. The pressure sensor 22 can use any desired sampling frequency, for example 50 measurements per second (50 Hz), 64 Hz, 100 Hz, 2 Hz, 4 Hz, etc.

The pressure measurements or pressure measurement signal can be stored by the processing unit 18 in the memory unit 20.

The interface circuitry 24 in the shaving device 4 enables a data connection to and/or from the apparatus 6, and/or a data connection to and/or from other devices, such as a server, a database, etc. The interface circuitry 24 can operate and/or be implemented in any of the ways described above with respect to the interface circuitry 14 in the apparatus 6. The interface circuitry 24 is connected to the processing unit 18 to enable information or data received by the interface circuitry 24 to be provided to the processing unit 18, and/or information or data from the processing unit 18 (e.g. the pressure measurements or pressure measurement signal) to be transmitted by the interface circuitry 24.

In order to provide the feedback to the user about the applied pressure during the shaving operation, the shaving system 2 further comprises a feedback component that is operable to provide the feedback to the user. The feedback component may be in the apparatus 6, in which case it can be one of the elements in the user interface components 12, as shown in FIG. 1 by feedback component 26 in the user interface components 12. Alternatively the feedback component may be in the shaving device 4, as shown by feedback component 28 that is connected to processing unit 18. In either case, the relevant processing unit 8, 18 can output a feedback control signal to the feedback component 26, 28 in order to control the feedback component 26, 28 to provide the required feedback. The feedback can be in any suitable or desired form, including one or more of a visual element, an audible element, a haptic (tactile) element, etc., and the feedback component 26, 28 can be in a form that is able to provide or output those elements. A visual element can comprise the colour of emitted light, letters, numbers, symbols, pictures, etc. and therefore the feedback component 26, 28 can comprise a display element such as a display screen, such as that used on a smart watch, smart phone, tablet, smart mirror or other personal electronic device. Alternatively (or in addition), the visual element can be provided using one or more lights (e.g. one or more light emitting diodes (LEDs)) having one or more colours (e.g. red, orange, yellow, green, blue etc.). An audible element can comprise a tone or beep, a verbal message, etc., and therefore the feedback component 26, 28 can comprise a loudspeaker for generating the required audio. The haptic element may comprise a vibration of a particular intensity and/or duration, and therefore the feedback component 26, 28 can comprise a component that can generate vibrations, for example a vibration motor. It will be appreciated that the feedback to be provided may comprise multiple types of feedback (e.g. visual and audible), and therefore feedback component 26, 28 can be configured or capable of providing feedback of the appropriate type(s). In a preferred embodiment, the feedback component 28 in the shaving device 4 is a light source that is operable or controllable to emit light of different colours to provide the feedback.

It will be appreciated that FIG. 1 only shows elements of the shaving device 4 and apparatus 6 that are useful for explaining the techniques described herein, and the shaving device 4 and apparatus 6 will include other elements that are not shown in FIG. 1. For example, it will be understood that both the shaving device 4 and apparatus 6 will require a power supply, such as a battery and/or a connection to a mains power supply in order to perform the described functions, and shaving device 4 will include one or more cutting elements for cutting hair and an actuator for actuating/operating the cutting element(s). The shaving device 4 may also include one or more user interface components that can enable the user to interact with and control the shaving device 4, for example to activate or deactivate the cutting element(s) on the shaving device 4, and/or to control one or more settings or operations of the shaving device 4. The user interface components on the shaving device 4 may provide information about the shaving device 4 to the user, for example a battery charge status, etc. In further embodiments, the shaving device 4 may include a movement sensor, such as an accelerometer, for measuring the movement or motion of the shaving device 4 during use by the user. The measurements from the movement sensor can be used to provide feedback to the user about the motion of the shaving device 4 during the shaving operation using the techniques described in WO 2018/206805.

As noted above, the techniques described herein enable feedback to be provided on the pressure that the shaving device is being applied on to the skin of a user. Generally, it is possible to define a pressure range within which a typical user should press the shaving device 4 on to their skin to achieve an acceptable shaving result. However, such a 'generic' pressure range will not be suitable for every user, since users may differ on their desired outcome for the shave (e.g. some users may want the closest shave possible, whereas others prefer to retain some level of stubble), users may differ in their perceptions of what a 'good' shave is, and they may differ in terms of skin irritation received from shaving. Therefore it has been found that it is not possible to define a generic pressure range that is suitable for all users and their desired outcomes. Therefore the techniques provided herein enable the pressure range to be personalised to the particular user based on values for one or more parameters relating to their shaving. The shaving pressure is then measured during a shaving operation and compared to the user-specific pressure range, with feedback on the applied pressure being based on the result of that comparison.

Figure 2:
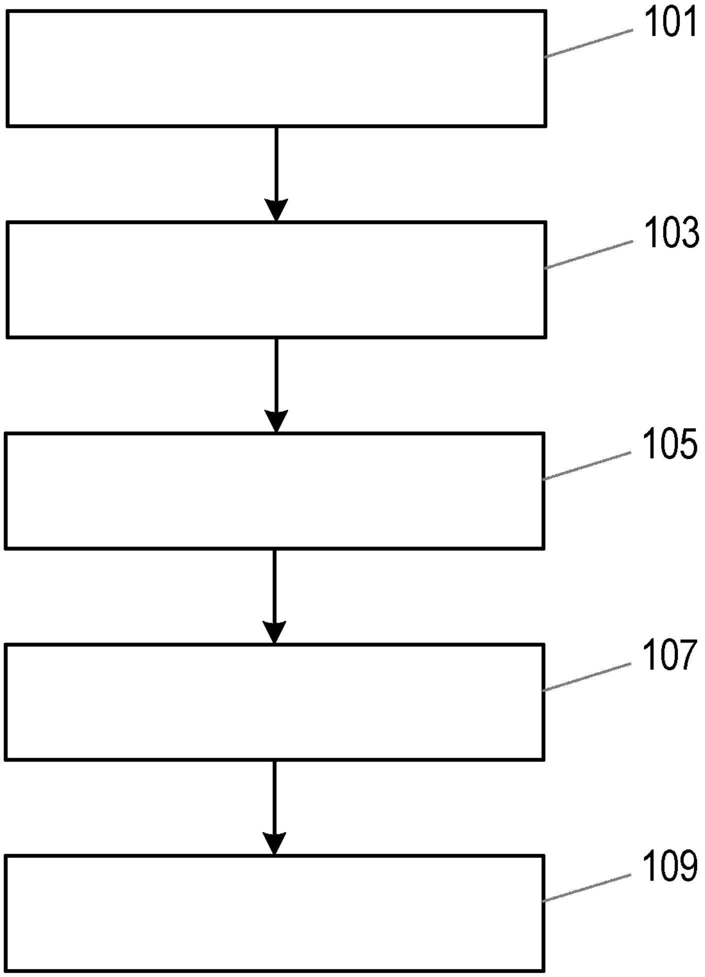
FIG. 2 is a flow chart illustrating an exemplary method according to various embodiments.

FIG. 2 illustrates a method of providing feedback to a user of a shaving device 4 during a shaving operation according to an aspect of the techniques described herein. Any of the steps of the method can be performed by the processing unit 8 in the apparatus 6 or by the processing unit 18 in the shaving device 4, in conjunction with any of the pressure sensor 22, the memory unit 10, the memory unit 20, the interface circuitry 14, interface circuitry 24, the user interface components 12 and/or the feedback component 26, 28 as appropriate. Either processing unit 8, 18 may perform the one or more steps in response to executing computer program code that can be stored on a computer readable medium, such as, for example, the memory unit 10 and memory unit 20 respectively.

In step 101, values for one or more parameters are determined for the user. The one or more parameters comprise at least one of a shaving frequency measure, a skin irritation measure, a shaving closeness measure and an indication of whether the shaving device 4 is used on wet or dry skin during the shaving operation. In some embodiments values for two or more of the parameters are determined in step 101. In some embodiments values for all four of the listed parameters are determined in step 101.

The shaving frequency measure indicates how often the user performs a shaving operation using the shaving device 4. Possible values for the shaving frequency measure can include 'every day', 'every 2 days', 'once per week', etc. In some embodiments the value for the shaving frequency measure is determined in step 101 by receiving an input from the user via the user interface components 12 in the apparatus 6 indicating the shaving frequency, or by retrieving a value previously input by the user from the memory unit 10 or memory unit 20. Alternatively, the shaving frequency can be determined automatically by analysing usage information indicating how often the shaving device 4 is used to perform a shaving operation. In this case, the value for the shaving frequency measure can be determined based on the usage information collected by the shaving device 4.

The skin irritation measure indicates skin irritation experienced by the user during and/or following a shaving operation with the shaving device 4. Possible values for the skin irritation measure can range from 'no irritation' to 'a lot of irritation', etc., or the skin irritation can be expressed as a numerical value. In some embodiments the value for the skin irritation measure is determined in step 101 by receiving an input from the user via the user interface components 12 in the apparatus 6 indicating the skin irritation, or by retrieving a value previously input by the user from the memory unit 10 or memory unit 20. Alternatively, the skin irritation can be determined from measurements of the skin following a previous shaving operation. For example an image or measurement signal can be obtained of the skin after a shaving operation and the image or measurement signal analysed using techniques known in the art to determine an amount of irritation, e.g. as indicated by an amount of redness of the skin (or an amount of redness of the skin after a shaving operation compared to before the shaving operation). In this case, the value for the skin irritation measure can be determined in step 101 dynamically by analysing an image of the skin or measurement signal, or by retrieving a previously determined value for the skin irritation from a memory, e.g. memory unit 10 or memory unit 20.

The shaving closeness measure indicates how short the user desires their hair to be after a shaving operation with the shaving device 4. Possible values for the shaving closeness measure can be 'very close', 'close' or 'normal', etc. In some embodiments the value for the shaving closeness measure is determined in step 101 by receiving an input from the user via the user interface components 12 in the apparatus 6 indicating the desired shaving closeness, or by retrieving a value previously input by the user from the memory unit 10 or memory unit 20.

The indication of whether the shaving device 4 is used on wet or dry skin during the shaving operation can have possible values of 'wet', 'dry' and 'both', for example. In some embodiments the value for whether the shaving device 4 is used on wet or dry skin is determined in step 101 by receiving an input from the user via the user interface components 12 in the apparatus 6, or by retrieving a value previously input by the user from the memory unit 10 or memory unit 20. Alternatively, it can be determined from measurements by a moisture sensor obtained during a previous shaving operation, with the assumption that the next shaving operation will be performed under similar conditions. In this case, the value for whether the shaving device 4 will be used on wet or dry skin can be determined in step 101 dynamically by analysing measurements obtained by a moisture sensor when the shaving device 4 was previously in use, or by retrieving a previously determined indication from a memory, e.g. memory unit 10 or memory unit 20. The moisture sensor measures moisture on the skin and/or shaving device 4 during a shaving operation.

It will be appreciated that the values determined in step 101 may relate to previous shaving operations by the user (particularly the skin irritation measure and shaving frequency measure), or they may relate to the next or future shaving operations by the user (particularly the shaving closeness measure and whether it will be a wet or dry shaving operation).

Figure 3:
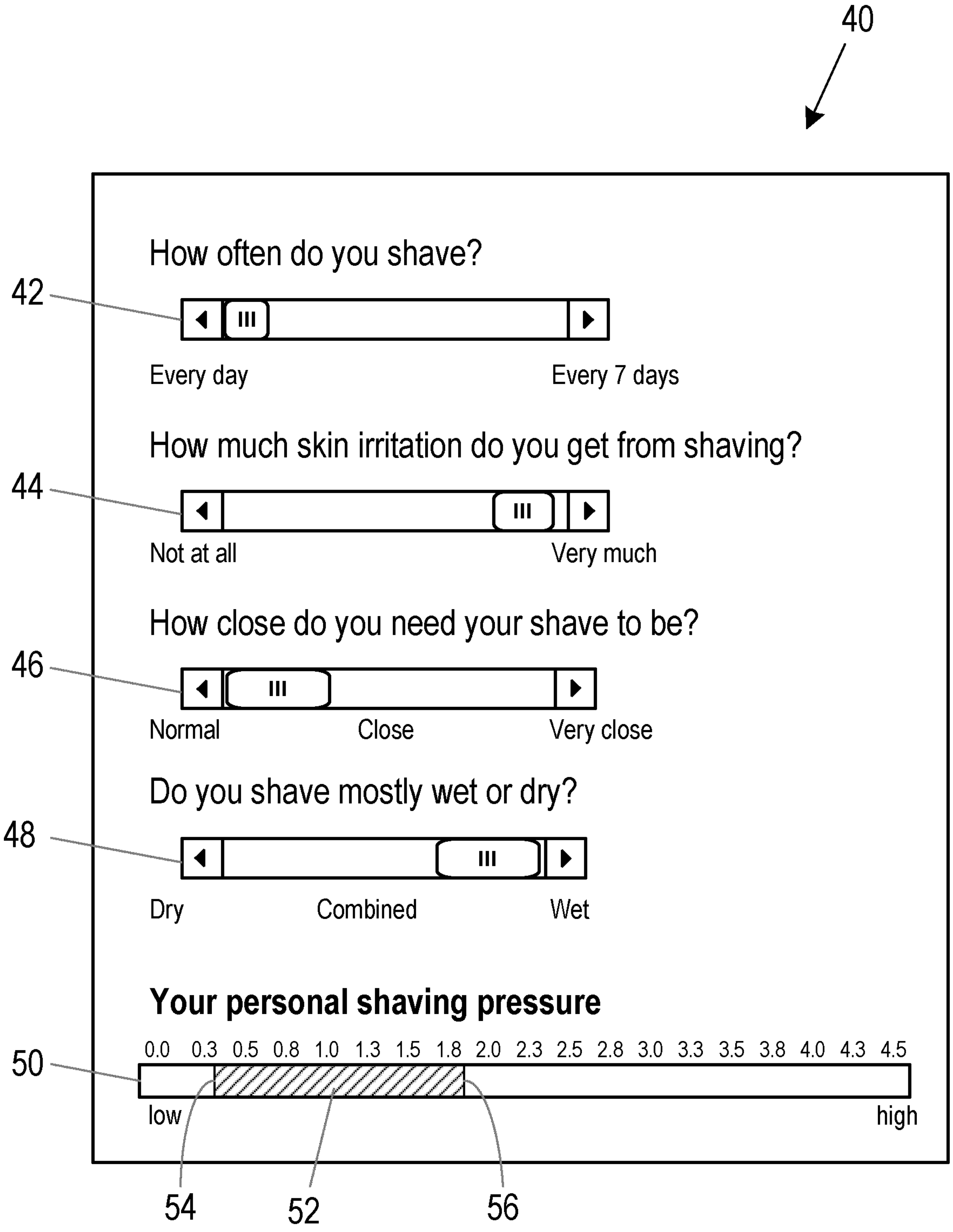
FIG. 3 shows an exemplary user interface that can be used to input values for various parameters.

FIG. 3 shows an exemplary user interface 40 that can be displayed on a display screen of the apparatus 6 that enables the user to input the values of each of the four parameters defined above. Thus, there is an input user interface (UI) element for each of the shaving frequency measure (UI element 42), the skin irritation measure (UI element 44), the shaving closeness measure (UI element 46) and whether the shaving operation is on wet or dry skin (UI element 48). In this example each UI element 42, 44, 46, 48 is a slider bar, with the value of each parameter being input by the user moving the slider along the slider bar to the appropriate value. Those skilled in the art will appreciate that other UI elements can be used on a user interface 40. For example any of the UI elements 42, 44, 46, 48 can be a drop-down list, a list of possible values, a set of radial buttons associated with respective values, a free-text field, etc.

In step 103 a pressure range for the user is determined based on the values for the one or more parameters determined in step 101. The pressure range is the personalised pressure range for the user to use in the next shaving operation. The pressure range lies between an upper pressure threshold and a lower pressure threshold. The exemplary user interface 40 shown in FIG. 3 also includes a UI element 50 representing the determined pressure range. The UI element 50 is a scale that includes the pressure range as a bar 52 on the scale between the lower pressure threshold 54 and the upper pressure threshold 56. In this example, the scale is indicated in units of force (Newton, N) as the surface area over which the force is applied is constant. Also in this example the pressure range 52 is shown as being between 0.9 N and 2.1 N.

In some embodiments the values of a particular parameter may alter or set one or more of the value of the lower pressure threshold, the value of the upper threshold, or the extent or width of the pressure range (i.e. the magnitude of the difference between the upper pressure threshold and the lower pressure threshold).

Further details of step 103 are provided below.

After the pressure range has been determined in step 103, pressure measurements representing the pressure with which the shaving device 4 is being applied on to the skin of the user are received (step 105). To enable the feedback to be provided to the user in real-time or near real-time (i.e. close enough that the user can use the feedback to help adjust their current shaving behaviour), the pressure measurements are received during the shaving operation. Thus, in step 105, pressure measurements obtained by the pressure sensor 22 are received by the processing unit 8 or processing unit 18 (as appropriate depending on which processing unit performs the subsequent steps of the method).

Next, in step 107, the received pressure measurements are compared to the pressure range determined in step 103 to determine feedback for the user relating to the applied pressure.

In some embodiments if it is determined in step 107 that the applied pressure is in the determined pressure range (i.e. the applied pressure is above the lower pressure threshold and below the upper pressure threshold), then step 107 can comprise determining first feedback that indicates the correct pressure. For example the first feedback can be a green light, a tick (check symbol), an indication of the applied pressure on a graphical representation of the pressure range, a specific noise, an audio message, or any other type of feedback that conveys, or can be understood as conveying, positive feedback to the user. If it is determined that the applied pressure is not in the determined pressure range (i.e. the applied pressure is below the lower pressure threshold or above the upper pressure threshold), then step 107 can comprise determining second feedback that indicates an incorrect pressure. For example the second feedback can be a red light, a cross, an indication of the applied pressure on a graphical representation of the pressure range, a specific noise, an audio message, or any other type of feedback that conveys, or can be understood as conveying, negative feedback to the user.

To improve the guidance provided to the user about the correct pressure to use, rather than provide a single type of feedback if the applied pressure is not correct as in the above embodiments, in alternative embodiments, different negative feedback can be provided depending on whether the applied pressure is below the determined pressure range (i.e. below the lower pressure threshold), or above the determined pressure range (i.e. above the upper pressure threshold). In these embodiments, when the applied pressure is in the determined pressure range, first feedback can be determined as described above. When the applied pressure is below the determined pressure range, second feedback can be determined that indicates a low incorrect pressure. For example the second feedback can be a blue light, a down arrow, an indication on a graphical representation of the pressure range, a specific noise, an audio message, or any other type of feedback that conveys, or can be understood as conveying, feedback that the applied pressure is too low to the user. If the applied pressure is above the determined pressure range, third feedback can be determined that indicates a high incorrect pressure. For example the third feedback can be a red light, an up arrow, an indication of the applied pressure on a graphical representation of the pressure range, a specific noise, an audio message, or any other type of feedback that conveys, or can be understood as conveying, feedback that the applied pressure is too high to the user.

Finally, in step 109, the processing unit 8, 18 generates and outputs a feedback control signal to a feedback component 26, 28. The feedback control signal is generated such that it controls the feedback component 26, 28 to provide the determined feedback to the user. For example if the applied pressure is in the determined pressure range, the feedback control signal can control a light-based feedback component 26, 28 to generate green light.

In some embodiments, the method can further comprise the step of generating the determined feedback using the feedback component 26, 28 in response to the feedback control signal.

In further embodiments, as noted above, the method can further comprise providing feedback on the motion of the shaving device 4 during the shaving operation. Therefore, during the shaving operation movement measurements can be received that represent the movement of the shaving device 4 by the user, the received movement measurements can be processed to determine a type of motion of the shaving device 4 by the user (e.g. linear motion, large circular motion, small circular motion, etc.) and then motion feedback can be determined relating to the determined type of motion. In these embodiments the feedback control signal is determined such that it controls the feedback component 26, 28 to provide the determined motion feedback to the user in addition to the pressure feedback.

In some embodiments, after the user has completed one or more shaving operations (e.g. over the course of several days), the user can input an indication of their satisfaction with the one or more shaving operations. For example the user can provide an input indicating whether they are experiencing better or worse skin irritation, whether the shaving closeness is as desired, or more generally whether the user is satisfied with the shaving operation or shaving device 4. If the received indication indicates that the user is not satisfied with the shaving operations or shaving device 4, then an output can be provided to the user to indicate that the value of the one or more parameters determined in step 101 should be changed (and optionally the output may provide a suggested change, e.g. shave more/less frequently, shave in the wet/dry, etc.). In this way the user can be prompted to change their behaviour (as input in step 101) to improve their satisfaction with the shaving device 4 or shaving operation.

In step 103, the lower pressure threshold can be dependent on the value of the shaving frequency measure. In general, the more frequently that the user performs a shaving operation, the lower the lower pressure threshold. Thus, in embodiments of step 103, the lower pressure threshold can be set to a first lower pressure threshold value when the shaving frequency measure has a first shaving frequency value and the lower pressure threshold can be set to a second lower pressure threshold value when the shaving frequency measure has a second shaving frequency value. The first shaving frequency value represents more frequent shaving than the second shaving frequency value (e.g. every day vs once per week) and the first lower pressure threshold value is lower than the second lower pressure threshold value.

In step 103, the upper pressure threshold and/or lower pressure threshold can be dependent on the value of the skin irritation measure. In general, the higher the skin irritation, the lower the upper pressure threshold and the lower the lower pressure threshold, since the skin irritation may be due to, or worsened by, pressing the shaving device 4 on to the skin too firmly. Thus, in embodiments of step 103, the upper pressure threshold can be set to a first upper pressure threshold value when the skin irritation measure has a first skin irritation value and the upper pressure threshold can be set to a second upper pressure threshold value when the skin irritation measure has a second skin irritation value. The first skin irritation value represents more skin irritation than the second skin irritation value and the first upper pressure threshold value is lower than the second upper pressure threshold value. Alternatively or in addition, in embodiments of step 103, the lower pressure threshold can be set to a first lower pressure threshold value when the skin irritation measure has a first skin irritation value and the lower pressure threshold can be set to a second lower pressure threshold value when the skin irritation measure has a second skin irritation value. Again, the first skin irritation value represents more skin irritation than the second skin irritation value, the first lower pressure threshold value is lower than the second lower pressure threshold value.

In step 103, the upper pressure threshold and/or lower pressure threshold can be dependent on the value of the shaving closeness measure. In general, the closer the shave is to be (i.e. the shorter the hair after the shaving operation), the higher the upper pressure threshold and/or lower pressure threshold should be. Thus, in embodiments of step 103, the upper pressure threshold can be set to a first upper pressure threshold value when the shaving closeness measure has a first shaving closeness value and the upper pressure threshold can be a second upper pressure threshold value when the shaving closeness measure has a second shaving closeness value. The first shaving closeness value represents a closer shave than the second shaving closeness value and the first upper pressure threshold value is higher than the second upper pressure threshold value. Alternatively or in addition, in embodiments of step 103, the lower pressure threshold can be set to a first lower pressure threshold value when the shaving closeness measure has a first shaving closeness value and the lower pressure threshold can be a second lower pressure threshold value when the shaving closeness measure has a second shaving closeness value. Again, the first shaving closeness value represents a closer shave than the second shaving closeness value and the first lower pressure threshold value is higher than the second lower pressure threshold value.

In step 103, the upper pressure threshold and/or lower pressure threshold can be dependent on whether the shaving device 4 is used on wet or dry skin during the shaving operation. In general, the pressure should be lower if the shaving device 4 is used on wet skin than compared to dry skin (i.e. the upper pressure threshold and/or lower pressure threshold should be lower for use on wet skin compared to use on dry skin). Thus, in embodiments of step 103, the upper pressure threshold can be set to a first upper pressure threshold value when the shaving device 4 is used on dry skin and the upper pressure threshold can be set to a second upper pressure threshold value when the shaving device 4 is used on wet skin. Here, the first upper pressure threshold value is higher than the second upper pressure threshold value. Alternatively or in addition, in embodiments of step 103, the lower pressure threshold can be set to a first lower pressure threshold value when the shaving device 4 is used on dry skin and the lower pressure threshold can be set to a second lower pressure threshold value when the shaving device 4 is used on wet skin. Here, the first lower pressure threshold value is higher than the second lower pressure threshold value.

It will be appreciated that in embodiments where the one or more parameters includes multiple ones of the shaving frequency measure, the shaving closeness measure, the skin irritation measure and whether the shaving device 4 is used on wet or dry skin, the values of each of the parameters can contribute to the value of the upper pressure threshold and/or lower pressure threshold. For example, the lower pressure threshold and upper pressure threshold can vary from lowest possible values when the shaving frequency measure is 'every day', the skin irritation measure is 'a lot of irritation', the shaving closeness measure is 'normal' or 'less close' and the shaving device 4 is used on wet skin, to their highest possible values when the shaving frequency measure is 'once per week', the skin irritation measure is 'no irritation', the shaving closeness measure is 'very close' and the shaving device 4 is used on dry skin.

Table 1 below illustrates an exemplary embodiment for the setting of the lower pressure threshold, the upper pressure threshold and the pressure range (i.e. the difference between the lower pressure threshold and the upper pressure threshold).

TABLE 1

| PERSONALISED | Value range | | | Max Δ if value = MIN | | Max Δ if value = MAX | |
|---|---|---|---|---|---|---|---|
| DELTAS | min | max | Ref | ΔL1 | ΔH1 | ΔL2 | ΔH2 |
| Shaving frequency measure (days between shaves) | 1 | 7 | 2 | | | 0.1 | |
| Skin irritation measure (1 = no irritation, 5 = high irritation) | 1 | 5 | 3 | | 0.5 | −0.5 | −1.0 |
| Shaving closeness measure (1 = normal, 3 = very close) | 1 | 3 | 2 | −0.5 | | 0.5 | 0.5 |
| Shaving device used on dry skin (1), wet skin (3) or both (2) | 1 | 3 | 1 | −0.1 | −0.1 | −0.2 | −0.2 |

Table 1 shows the range of values for each of the four parameters, and a reference value (Ref) for each parameter, where the reference value represents a nominal or default value for the parameter (for example the nominal value for the shaving frequency measure is 'shave every 2 days', the nominal value for the skin irritation measure is 'moderate irritation', the nominal value for the shaving closeness measure is 'moderate closeness' and the nominal value for shaving in the wet/dry is 'dry'). The "Max Δ if value=MIN" column provides respective correction factors for the nominal values of the lower pressure threshold (ΔL1) and the upper pressure threshold (ΔH1) when the value of the parameter is below the reference value. The "Max Δ if value=MAX" column likewise provides respective correction factors for the nominal values of the lower pressure threshold (ΔL2) and the upper pressure threshold (ΔH2) when the value of the parameter is above the reference value. The correction factors for the pressure thresholds are expressed in Newton, N. The lower pressure threshold can have a default value that the adjustments indicated in Table 1 are applied to. For example the default value can be 1.5 N. The upper pressure threshold can have a default value that the adjustments indicated in Table 1 are applied to. For example the default value can be 3.0 N.

Equations (1) and (2) are exemplary formulae for use in step 103 to determine the values of the lower pressure threshold and upper pressure threshold respectively. In these equations, the value of the shaving frequency measure is represented by Days (w)∈{1,2,3,4,5,6,7}, the value of the skin irritation measure is represented by Irritation (x)∈{1, 2,3,4,5}, the value of the shaving closeness measure is represented by Closeness (y)∈{1,2,3}, and the value of whether the shaving device 4 is used on wet or dry skin is given by DCW(z)∈{1,2,3}. The default value for the lower pressure threshold is denoted Nominal L, and the default value for the upper pressure threshold is denoted Nominal H. Thus, the lower pressure threshold (denoted Pressure Low) can be given by:

$$\begin{aligned}\text{Pressure Low} =\ &\text{Nominal } L + \left[\text{If}(\text{Days}(w) > Days_{Ref}) * \left(\frac{\text{Days}(w) - Days_{Ref}}{Days_{max} - Days_{Ref}}\right) * \Delta L2_{Days}\right] + \\ &\left[\text{If}(\text{Irritation}(x) > Irritation_{Ref}) * \left(\frac{\text{Irritation}(x) - Irritation_{Ref}}{Irritation_{max} - Irritation_{Ref}}\right) * \Delta \text{L}2_{Irritation}\right] + \\ &\left[\text{If}(\text{Closeness}(y) < Closeness_{Ref}) * \left(\frac{Closeness_{Ref} - \text{Closeness}(y)}{Closeness_{Ref} - Days_{min}}\right) * \Delta L1_{Closeness}\right] + \\ &\left[\text{If}(\text{Closeness}(y) > Closeness_{Ref}) * \left(\frac{\text{Closeness}(y) - Closeness_{Ref}}{Closeness_{max} - Closeness_{Ref}}\right) * \Delta \text{L}2_{Closeness}\right] + \\ &[\text{If}(DCW(z) = 2) * \Delta L1_{DCW}] + [\text{If}(DCW(z) = 3) * \Delta L2_{DCW}]\end{aligned} \quad (1)$$

$$\begin{aligned}\text{Pressure high} =\ &\text{Nominal } H + \left[\text{If}(\text{Irritation}(x) > Irritation_{Ref}) * \left(\frac{\text{Irritation}(x) - Irritation_{Ref}}{Irritation_{max} - Irritation_{Ref}}\right) * \Delta \text{H}2_{Irritation}\right] + \\ &\left[\text{If}(\text{Irritation}(x) < Irritation_{Ref}) * \left(\frac{Irritation_{Ref} - \text{Irritation}(x)}{Irritation_{Ref} - Irritation_{min}}\right) * \Delta H1_{Irritation}\right] + \\ &\left[\text{If}(\text{Closeness}(y) > Closeness_{Ref}) * \left(\frac{\text{Closeness}(y) - Closeness_{Ref}}{Closeness_{max} - Closeness_{Ref}}\right) * \Delta H2_{Closeness}\right] + \\ &[\text{If}(DCW(z) = 2) * \Delta H1_{DCW}] + [\text{If}(DCW(z) = 3) * \Delta H2_{DCW}]\end{aligned} \quad (2)$$

where $*_{Ref}$ represents the reference value for parameter * as set out in Table 1, and ΔL1*, ΔL2*, ΔH1*, and ΔH2* represent the adjustment to the lower pressure threshold or upper pressure threshold as appropriate due to the value of parameter *.

As outlined above, in some embodiments of step 107, different feedback can be determined for the user, where the feedback is just determined based on a comparison of the applied pressure/force to the upper pressure threshold and lower pressure threshold. For example, the feedback can be blue light if the applied pressure/force is above the lower pressure threshold and below the upper pressure threshold, and the feedback can be red light if the applied pressure/ force is above the upper pressure threshold. As a result, in these embodiments there may be abrupt changes in the provided feedback (e.g. flicking between red and green) as the user is using the shaving device 4, since the applied naturally pressure varies during the shaving operation. Therefore in some embodiments a boundary region can be defined around one or both of the lower pressure threshold and the upper pressure threshold, and the feedback to be provided when the applied pressure/force is within one of these boundary regions is a combination of the feedbacks for the surrounding pressure range. For example, for a boundary region around the lower pressure threshold, when the applied pressure/force is within the boundary region, the determined feedback can be a combination of blue light and green light.

Figure 4:
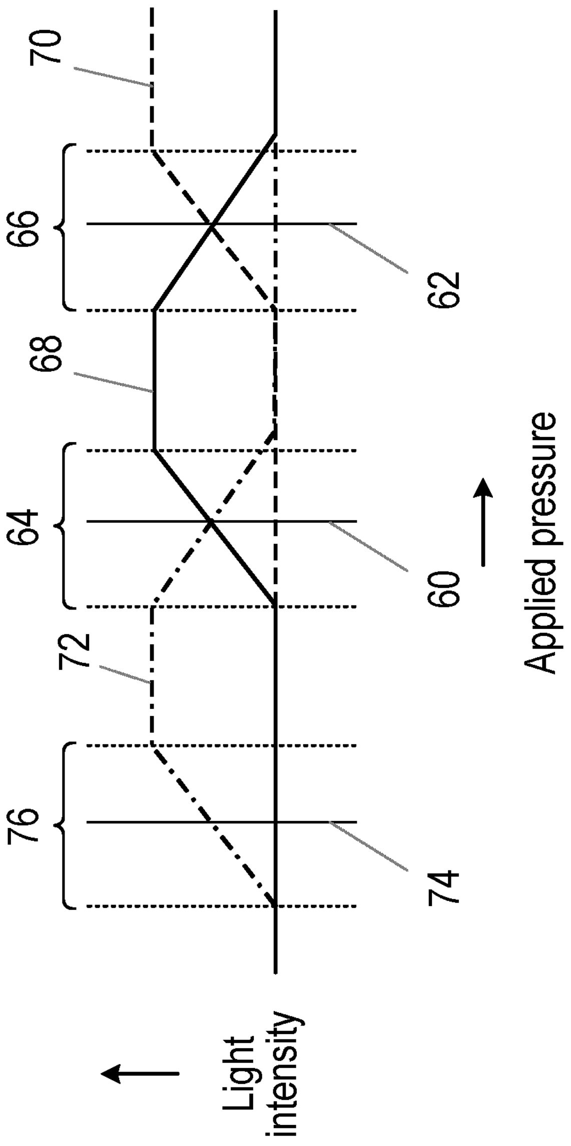
FIG. 4 is a graph representing the colour of light feedback provided by a light source for different values of the applied pressure/force.

In some embodiments, the feedback when the applied pressure/force is in the boundary region is determined as a function of the applied pressure/force, for example a linear combination of the surrounding feedbacks. This is illustrated in FIG. 4 which is a graph representing the colour of light feedback provided by a light source for different values of the applied pressure/force. The lower pressure threshold 60 and upper pressure threshold 62 are shown, along with a first boundary region 64 centred on the lower pressure threshold 60 and a second boundary region 66 centred on upper pressure threshold 62. The solid line 68 represents the intensity of the green light, and it can be seen that the feedback is only green light 68 when the applied pressure/force is between the lower pressure threshold 60 and the upper pressure threshold 62, and specifically between the first boundary region 64 and the second boundary region 66. The dashed line 70 represents the intensity of the red light, and it can be seen that the feedback is only red light 70 when the applied pressure/force is above the upper pressure threshold 62, and specifically above the second boundary region 66. However, when the applied pressure/force is in the second boundary region 66, the feedback comprises both green light 68 and red light 70. In the illustrated embodiment, the feedback determined when the applied pressure/force is in the second boundary region 66 is a linear combination of the intensities of the green light 68 and the red light 70, such that there is a gradual transition in the colour of the feedback across the second boundary region 66. It will be understood that the linear combination can be a weighted combination of the intensities of the green light 68 and the red light 70, with the weighting for the intensity of the green light 68 and the weighting for the intensity of the red light 70 each being determined based on a linear function of the applied pressure/force, i.e. based on a linear relation between the respective light intensity and the applied pressure/force.

The dot-dashed line 72 represents the intensity of the blue light, and it can be seen that the feedback is only blue light 72 when the applied pressure/force is below the lower pressure threshold 64, and specifically below the first boundary region 64. However, when the applied pressure/force is in the first boundary region 64, the feedback comprises both blue light 72 and green light 68. In the illustrated embodiment, the feedback determined when the applied pressure/force is in the first boundary region 64 is a linear combination of the intensities of the blue light 72 and the green light 68, such that there is a gradual transition in the colour of the feedback across the first boundary region 64. It will be understood that the linear combination can be a weighted combination of the intensities of the blue light 72 and the green light 68, with the weighting for the intensity of the green light 68 and the weighting for the intensity of the blue light 72 each being determined based on a linear function of the applied pressure/force, i.e. based on a linear relation between the respective light intensity and the applied pressure/force.

It will be appreciated that the boundary regions described above can also be applied to embodiments where the feedback is the same (e.g. red light) regardless of whether the applied pressure/force is below the lower pressure threshold 60 or above the upper pressure threshold 62. In other words, the feedback when the applied pressure/force is in the first boundary region 64 or the second boundary region 66 can be a combination of the red light and green light.

Although FIG. 4 illustrates the boundary regions 64, 66 with respect to feedback in the form of the colour of the emitted light, it will be appreciated that the use of the boundary regions 64, 66 and combination of different feedback when the applied pressure/force is in the boundary region 64, 66 can be applied to other types of feedback, such as different colours and/or intensities of light, sounds, vibrations, etc.

FIG. 4 also shows a second lower pressure threshold 74. This second lower pressure threshold 74 can be used as a cut-off threshold below which feedback is not provided to the user. In particular, during a shaving operation, when the shaving device 4 is lifted off of the skin and repositioned elsewhere on the skin, the applied pressure/force will fall below the lower pressure threshold 60, but it is not necessary at these pressures/forces to provide feedback to the user that the pressure is too low. Therefore, the second lower pressure threshold 74 can be a cut-off threshold, below which no feedback is determined for the user in step 107. For example, if the applied pressure/force is below the second lower pressure threshold 74, no light may be emitted.

FIG. 4 also shows a third boundary region 76 that is centred on the second lower pressure threshold 74 that can be used in a similar way to the first and second boundary regions 64, 66 as described above. That is, the feedback provided to the user can be a function of the applied pressure/force, with the effect that the feedback provided when the applied pressure/force is below the lower pressure threshold 60 and below the first boundary region 64 linearly decreases across the third boundary region 76 as the applied pressure/force decreases.

In any of the above embodiments, step 107 can comprise comparing the raw (i.e. unprocessed) pressure measurements to the determined pressure range. Alternatively, given that the applied pressure/force can vary over quite short timescales during a shaving operation, and/or there may be noise/artefacts in the measured pressure, it is desirable to avoid the feedback rapidly alternating (e.g. flickering between red and green), as this may make it difficult for the user to adapt their use of the shaving device 4 in an appropriate way and/or it may be distracting for the user. Therefore in some embodiments the received pressure measurements can be filtered with a low-pass filter to smooth of the noise/artefacts or other short-term variations in the measured pressure. The filtered pressure measurements can then be compared to the determined pressure range in step 107. In some embodiments the low pass filter is a first order low-pass filter. In some embodiments, the low-pass filter has a time constant in the range of 0.1 seconds to 0.7 seconds. For example the time constant can be 0.2 seconds. It will be appreciated that the time constant should not be too short (e.g. less than 0.1 seconds or less than 0.2 seconds) as this can lead to the feedback rapidly changing or alternating, which can be distracting for the user or make it difficult or frustrating for the user to correctly adapt their use of the shaving device 4. It will also be appreciated that the time constant should not be too long (e.g. more than 0.7 seconds or more than 0.63 seconds) as again the user will have difficulty in relating the feedback to their own behaviour in using the shaving device 4 due to the delay between the relevant motion and the feedback.

Thus there are provided techniques that determine and provide suitable feedback relating to the pressure with which a shaving device 4 is being applied to the skin.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method of providing feedback by a feedback circuitry associated with a shaving device to a user of the shaving device during a plurality of shaving operations, wherein each shaving operation comprises a plurality of movements of the shaving device by the user, the method comprising:

determining values for one or more parameters, the one or more parameters comprising: a shaving frequency value indicating how often the user performs a shaving operation of the plurality of shaving operations using the shaving device; a skin irritation value indicating an amount of skin irritation of skin experienced by the user during and/or following each shaving operation with the shaving device; a shaving closeness value indicating desired shortness of hair from each shaving operation with the shaving device; and a moisture value indicating whether the shaving device is used on wet or dry skin during each shaving operation;

determining a pressure range for the user based on the determined values for the one or more parameters, wherein the pressure range is defined by an upper pressure threshold and a lower pressure threshold;

during each shaving operation using the shaving device, receiving pressure measurements representing an applied pressure with which the shaving device is being pressed onto the skin of the user;

comparing the received pressure measurements to the determined pressure range to determine feedback for the user relating to the applied pressure, wherein the determined feedback comprises first feedback indicating that the applied pressure is correct when the applied pressure is within the determined pressure range, and wherein the determined feedback comprises second feedback indicating that the applied pressure is incorrect when the applied pressure is outside the determined pressure range;

providing a feedback control signal to the feedback circuitry associated with the shaving device; and controlling the feedback circuitry using the feedback control signal to output the determined feedback as visual, audible and/or haptic guidance to the user.

2. The method as claimed in claim 1, wherein the one or more parameters comprises at least the shaving frequency measure, and the determining the pressure range comprises setting the lower pressure threshold to a first lower pressure threshold value when the shaving frequency measure has a first shaving frequency value and setting the lower pressure threshold to a second lower pressure threshold value when the shaving frequency measure has a second shaving frequency value, wherein the first shaving frequency value represents more frequent shaving than the second shaving frequency value and the first lower pressure threshold value is lower than the second lower pressure threshold value.

3. The method as claimed in claim 1, wherein the one or more parameters comprises at least the skin irritation measure, and the determining the pressure range comprises setting the upper pressure threshold to a first upper pressure threshold value when the skin irritation measure has a first skin irritation value and setting the upper pressure threshold to a second upper pressure threshold value when the skin irritation measure has a second skin irritation value, wherein the first skin irritation value represents more skin irritation than the second skin irritation value and the first upper pressure threshold value is lower than the second upper pressure threshold value.

4. The method as claimed in claim 1, wherein the one or more parameters comprises at least the shaving closeness measure, and the determining the pressure range comprises setting the upper pressure threshold to a first upper pressure threshold value when the shaving closeness measure has a first shaving closeness value and setting the upper pressure threshold to a second upper pressure threshold value when the shaving closeness measure has a second shaving closeness value, wherein the first shaving closeness value represents a closer shave than the second shaving closeness value and the first upper pressure threshold value is higher than the second upper pressure threshold value.

5. The method as claimed in claim 1, wherein the one or more parameters comprises at least whether the shaving device is used on wet or dry skin during the shaving operation, and the determining the pressure range comprises setting the upper pressure threshold to a first upper pressure threshold value when the shaving device is used on dry skin and setting the upper pressure threshold to a second upper pressure threshold value when the shaving device is used on wet skin, wherein the first upper pressure threshold value is higher than the second upper pressure threshold value.

6. The method as claimed in claim 1, wherein the determining feedback comprises determining first feedback indicating correct pressure when the applied pressure is within the determined pressure range, and determining second feedback indicating incorrect pressure when the applied pressure is outside the determined pressure range.

7. The method as claimed in claim 1, wherein the determining feedback comprises determining first feedback indicating correct pressure when the applied pressure is within the determined pressure range, determining second feedback indicating low incorrect pressure when the applied pressure is below the lower pressure threshold, and determining third feedback indicating high incorrect pressure when the applied pressure is above the upper pressure threshold.

8. The method as claimed in claim 7, wherein the pressure range further comprises a first boundary region around the lower pressure threshold and a second boundary region around the upper pressure threshold; and wherein the determining feedback comprises:

(i) determining the first feedback indicating correct pressure when the applied pressure is within the determined pressure range and outside the first boundary region and the second boundary region;

(ii) determining the second feedback indicating low incorrect pressure when the applied pressure is below the lower pressure threshold and outside the first boundary region;

(iii) determining the third feedback indicating high incorrect pressure when the applied pressure is above the upper pressure threshold and outside the second boundary region;

(iv) determining first intermediate feedback when the applied pressure is within the first boundary region, wherein the first intermediate feedback is a weighted combination of the first feedback and the second feedback, wherein the weighting for the first feedback and the weighting for the second feedback are each performed based on linear functions of the applied pressure; and (v) determining second intermediate feedback when the applied pressure is within the second boundary region, wherein the second intermediate feedback is a weighted combination of the first feedback and the third feedback; wherein the weighting for the first feedback and the weighting for the third feedback are each performed based on linear functions of the applied pressure.

9. The method as claimed in claim 1, wherein the comparing comprises filtering the received pressure measurements with a low pass filter, and comparing the filtered pressure measurements to the determined pressure range to determine the feedback.

10. A computer program product comprising a computer readable medium having computer readable code embodied therein, the computer readable code being configured such that, on execution by a suitable computer or processing unit, the computer or processing unit is caused to perform the method of claim 1.

11. An apparatus for providing feedback by a feedback circuitry associated with a shaving device to a user of the shaving device during a plurality of shaving operations, wherein each shaving operation comprises a plurality of movements of the shaving device by the user, the apparatus comprising:

a processor;

a tangible, non-transitory computer readable medium that stores computer executable code, which when executed by the processor, causes the processor to:

determine values for one or more parameters, the one or more parameters comprising: a shaving frequency value indicating how often the user performs a shaving operation of the plurality of shaving operations using the shaving device; a skin irritation value indicating an amount of skin irritation of skin experienced by the user during and/or following each shaving operation with the shaving device; a shaving closeness value indicating desired shortness of hair from each shaving operation with the shaving device; and a moisture value indicating whether the shaving device is used on wet or dry skin during each shaving operation;

determine a pressure range for the user based on the determined values for the one or more parameters, wherein the pressure range is defined by an upper pressure threshold and a lower pressure threshold;

during each shaving operation using the shaving device, receive pressure measurements representing an applied pressure with which the shaving device is being pressed onto the skin of the user;

compare the received pressure measurements to the determined pressure range to determine feedback for the user relating to the applied pressure, wherein the determined feedback comprises first feedback indicating that the applied pressure is correct when the applied pressure is within the determined pressure range, and wherein the determined feedback comprises second feedback indicating that the applied pressure is incorrect when the applied pressure is outside the determined pressure range;

provide a feedback control signal to the feedback circuitry associated with the shaving device; and control the feedback circuitry using the feedback control signal to output the determined feedback as visual, audible and/or haptic guidance to the user.

12. The apparatus as claimed in claim 11, wherein the computer executable code further causes the processor to determine feedback by: determining a first feedback indicating correct pressure when the applied pressure is within the determined pressure range; determining a second feedback indicating low incorrect pressure when the applied pressure is below the lower pressure threshold; and determining a third feedback indicating high incorrect pressure when the applied pressure is above the upper pressure threshold.

13. The apparatus as claimed in claim 11, wherein the computer executable code further causes the processor to filter the received pressure measurements with a low pass filter, and compare the filtered pressure measurements to the determined pressure range to determine the feedback.

14. The apparatus as claimed in claim 11, wherein the apparatus is part of the shaving device.

15. The apparatus as claimed in claim 11, wherein the apparatus is separate from the shaving device.

16. The apparatus of claim 11, wherein when determining the pressure range, the computer executable code further causes the processor to:

set the lower pressure threshold to a first lower pressure threshold value when the shaving frequency value is a first shaving frequency value; and set the lower pressure threshold to a second lower pressure threshold value when the shaving frequency value is a second shaving frequency value, wherein the first shaving frequency value represents more frequent shaving than the second shaving frequency value and the first lower pressure threshold value is lower than the second lower pressure threshold value.

17. The apparatus as claimed in claim 11, wherein when determining the pressure range the computer executable code further causes the processor to:

set the upper pressure threshold to a first upper pressure threshold value when the skin irritation value is a first skin irritation value; and set the upper pressure threshold to a second upper pressure threshold value when the skin irritation value is a second skin irritation value, wherein the first skin irritation value represents more skin irritation than the second skin irritation value and the first upper pressure threshold value is lower than the second upper pressure threshold value.

18. The apparatus as claimed in claim 11, wherein when determining the pressure range, the computer executable code further causes the processor to:

set the upper pressure threshold to a first upper pressure threshold value when the shaving closeness value is a first shaving closeness value; and set the upper pressure threshold to a second upper pressure threshold value when the shaving closeness value is a second shaving closeness value, wherein the first shaving closeness value represents a closer shave than the second shaving closeness value and the first upper pressure threshold value is higher than the second upper pressure threshold value.

19. The apparatus as claimed in claim 11, wherein when determining the pressure range, the computer executable code further causes the processor to:

set the upper pressure threshold to a first upper pressure threshold value when the shaving device is used on dry skin; and set the upper pressure threshold to a second upper pressure threshold value when the shaving device is used on wet skin, wherein the first upper pressure threshold value is higher than the second upper pressure threshold value.

20. The apparatus as claimed in claim 11, wherein when determining feedback, the computer executable code further causes the processor to:

determine first feedback indicating correct pressure when the applied pressure is within the determined pressure range; and determine second feedback indicating incorrect pressure when the applied pressure is outside the determined pressure range.

* * * * *